United States Patent
Ananthapur Bache et al.

(10) Patent No.: US 10,601,820 B2
(45) Date of Patent: Mar. 24, 2020

(54) METHOD AND APPARATUS TO IDENTIFY AND AUTHORIZE CALLER VIA ULTRASOUND

(71) Applicant: International Business Machines Corporation, Armonk, NY (US)

(72) Inventors: Vijay K. Ananthapur Bache, Bangalore (IN); Vijay Ekambaram, Chennai (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 15/373,941

(22) Filed: Dec. 9, 2016

(65) Prior Publication Data

US 2018/0167385 A1 Jun. 14, 2018

(51) Int. Cl.
| | |
|---|---|
| *H04L 29/06* | (2006.01) |
| *H04L 12/06* | (2006.01) |
| *G06F 21/32* | (2013.01) |
| *H04B 11/00* | (2006.01) |
| *H04W 12/12* | (2009.01) |
| *G06F 16/951* | (2019.01) |
| *H04W 12/06* | (2009.01) |
| *H04W 12/00* | (2009.01) |

(52) U.S. Cl.
CPC .......... *H04L 63/0861* (2013.01); *G06F 21/32* (2013.01); *H04B 11/00* (2013.01); *H04L 12/06* (2013.01); *G06F 16/951* (2019.01); *H04L 63/1466* (2013.01); *H04W 12/00504* (2019.01); *H04W 12/06* (2013.01); *H04W 12/12* (2013.01)

(58) Field of Classification Search
CPC ..... H04L 63/0861; H04L 63/06; H04L 12/06; H04W 12/02; H04W 12/12; G06F 21/32; G06F 17/30864
See application file for complete search history.

(56) References Cited

U.S. PATENT DOCUMENTS 8,090,366 B2 * 1/2012 McNamara ......... H04L 65/4023
455/424
8,467,512 B2 6/2013 Amir et al.
(Continued)

FOREIGN PATENT DOCUMENTS

WO 2008051729 5/2008
WO WO-2008051729 A2 * 5/2008 ......... H04L 65/1069

*Primary Examiner* — John B King
(74) *Attorney, Agent, or Firm* — Aaron N. Pontikos

(57) ABSTRACT

A system for authenticating an identity of an end-user on an electronic device associated with a subscriber is provided. The system includes: a processor in communication with a server, the processor being configured to perform a method including: storing, at the server, a signal database registered to a client end-user, the processor being configured to retrieve, from the signal database, an ultrasound signature associated with the client end-user; establishing an active communication with the end-user on the electronic device to initiate an end-user voice call; identifying, using the end-user voice call, an ultrasound signature associated with the end-user; and dynamically verifying the ultrasound signature associated with the end-user with the ultrasound signature of the client-end user to validate the end-user voice call, while maintaining the active communication with the end-user.

18 Claims, 4 Drawing Sheets

(56) References Cited

U.S. PATENT DOCUMENTS

| | | | |
|---|---|---|---|
| 8,970,561 B2* | 3/2015 | Xu | G06F 3/0346 |
| | | | 178/18.01 |
| 2002/0183005 A1* | 12/2002 | Yl | H04L 63/0428 |
| | | | 455/41.1 |
| 2003/0191951 A1* | 10/2003 | Cross | H04L 63/0442 |
| | | | 713/189 |
| 2004/0102959 A1* | 5/2004 | Estrin | G06F 21/32 |
| | | | 704/8 |
| 2012/0278614 A1* | 11/2012 | Choi | G06F 21/32 |
| | | | 713/159 |
| 2013/0218571 A1 | 8/2013 | Tamir et al. | |
| 2014/0058865 A1* | 2/2014 | Yang | G06Q 20/327 |
| | | | 705/21 |
| 2015/0033305 A1* | 1/2015 | Shear | G06F 21/45 |
| | | | 726/11 |
| 2015/0078628 A1* | 3/2015 | Anderson | G06K 9/00228 |
| | | | 382/115 |
| 2015/0106739 A1* | 4/2015 | Tan | G06F 3/0484 |
| | | | 715/750 |
| 2015/0143496 A1* | 5/2015 | Thomas | G06F 21/34 |
| | | | 726/7 |
| 2015/0193841 A1 | 7/2015 | Bernard | |
| 2018/0129849 A1* | 5/2018 | Strohmann | G06F 21/32 |

* cited by examiner

METHOD AND APPARATUS TO IDENTIFY AND AUTHORIZE CALLER VIA ULTRASOUND

BACKGROUND

The present invention relates in general to a method for identity verification on electronic devices, and more particularly, to a method for providing rapid and secure validation of an end-user's identity and credentials on electronic devices using an ultrasound signature, and a system for providing the same.

Telecommunication services have created communication channels worldwide, and those channels continue to expand with the advent of electronic devices, such as, cellular (or other mobile) devices, or home/office telephones and other wireless services. As is known, the advances in telecommunication services do not limit the exchange of communications between an individual (referred to herein as subscriber), and a caller to mere conversations, but that such an exchange may also promote business and financial transactions between the caller and the individual to be carried over the electronic device, if the caller were to be a legitimate entity (referred to herein as a client end-user), such as, the individual's bank. Disadvantageously, an entity (referred to herein as an end-user) may unscrupulously contact the subscriber, for example, using a telephone and other forms of telecommunications, and gain access to the subscriber's sensitive information, such as, passwords, ID number, and credit card numbers, etc., for instance, by impersonating an identity of the client end-user. This, in turn, may result in increasing the vulnerability and undesirable exposure of the subscriber to fraud and counterfeit.

Accordingly, there is a continuing need in the art to provide a real-time method that can immediately authenticate the identity of the end-user as the client end-user to the subscriber, thereby protecting the subscriber from fraudulent callers.

SUMMARY

In one aspect of the present application, a method for authenticating an identity of an end-user on an electronic device associated with a subscriber is provided. The system includes a processor in communication with a server, the processor being configured to perform a method including: storing, at the server, a signal database registered to a client end-user, the processor being configured to retrieve, from the signal database, an ultrasound signature associated with a client-end user; establishing an active communication with the end-user on the electronic device to initiate an end-user voice call; identifying, using the end-user voice call, an ultrasound signature associated with the end-user; and dynamically verifying the ultrasound signature associated with the end-user with the ultrasound signature of the client-end user to validate the end-user voice call, while maintaining the active communication with the end-user.

According to an embodiment, the processor, via voice recognition of the end-user, is configured to analyze the end-user voice call to determine a rule specific to the end-user, the rule including information regarding at least one of the ultrasound signature and a public key associated with the end-user.

According to an embodiment, the processor is further configured to evaluate the end-user voice call to identify the ultrasound signature associated with the end-user.

According to an embodiment, the processor is configured to initiate a query to the signal database of the client end-user to retrieve the ultrasound signature associated with the client end-user, subsequent to the identification of the ultrasound signature associated with the end-user.

According to an embodiment, a property of the ultrasound signature of the client end-user is compared with a corresponding property of the ultrasound signature associated with the end-user, where the property includes at least one of an ultrasound beep pattern and an ultrasound frequency.

According to an embodiment, the processor is configured to analyze the ultrasound signature to retrieve the public key associated with the end-user, subsequent to the validation of the end-user voice call.

According to an embodiment, the processor is configured to retrieve a public key associated with the client end-user.

According to an embodiment, the processor is further configured to transfer encrypted digital content data using each of the public keys of the end-user and the client end-user between the end-user and the client end-user, via an ultrasound signal.

According to an embodiment, the processor is further configured to create an alert, if the ultrasound signature associated with the client end-user and the ultrasound signature associated with the end-user are inconsistent with the audio signal of the end-user.

According to another aspect of the present application, a computer program product for authenticating an identity of an end-user on an electronic device associated with a subscriber is provided. The computer program product includes: a tangible storage medium storing program instructions readable by a processor in communication with a server for execution to perform a method including: storing, at the server, a signal database registered to a client end-user, the processor being configured to retrieve, from the signal database, an ultrasound signature associated with the client end-user; establishing an active communication with the end-user on the electronic device to initiate an end-user voice call; identify, using the end-user voice call, an ultrasound signature associated with the end-user; dynamically verifying the ultrasound signature associated with the end-user with the ultrasound signature of the client end-user to validate the end-user voice call, while maintaining the communication with the end-user.

According to another aspect of the present application, a system for authenticating an identity of an end-user is provided. The system includes an electronic device associated with a subscriber, the electronic device being configured to: store, at a server in communication with the electronic device, a signal database registered to a client end-user, the server being configured to retrieve, from the signal database, an ultrasound signature associated with a client-end user; establish an active communication with the end-user on the electronic device to initiate an end-user voice call, an ultrasound signature associated with the end-user; and dynamically verify the ultrasound signature associated with the end-user with the ultrasound signature of the client-end user to validate the end-user voice call, while maintaining the active communication with the end-user.

According to yet another aspect of the present application, a method for authenticating an identity of an end-user on an electronic device associated with a subscriber is provided. The method includes: storing, at a server that is in communication with a processor, a signal database registered to a client end-user, the processor being configured to retrieve, from the signal database, an ultrasound signature associated with the client end-user; establishing an active communication with the end-user on the electronic device to initiate an end-user voice call; identifying, using the end-user voice call, an ultrasound signature associated with the end-user; and dynamically verifying the ultrasound signature associated with the end-user with the ultrasound signature of the client end-user to validate the end-user voice call, while maintaining the active communication with the end-user.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present disclosure is directed to embodiments of a method and a system for authenticating an identity of an end-user on an electronic device, such as, cellular (or other mobile) devices, or home/office telephones and other wireless services, that is associated with a subscriber, where the electronic device may be subscribed to a service provider. In one aspect, an unsuspecting subscriber may typically be subjected to fraud by an unscrupulous end-user using techniques, such as, spoofing. As understood, spoofing, for example, includes impersonating an identity and a telephone number of a client end-user, and registering with the service provider with a counterfeit identity and telephone number by the end-user. In such an example, the counterfeit identity and telephone number of the end-user are displayed on the electronic device of the unsuspecting subscriber, who may then be convinced to provide their sensitive information such as, credit card number, date of birth, PIN number, etc. A subscriber is typically concerned about the legitimacy of such an end-user, and techniques that provide a real-time validation of an identity of the end-user can protect a subscriber from fraud.

Figure 1:
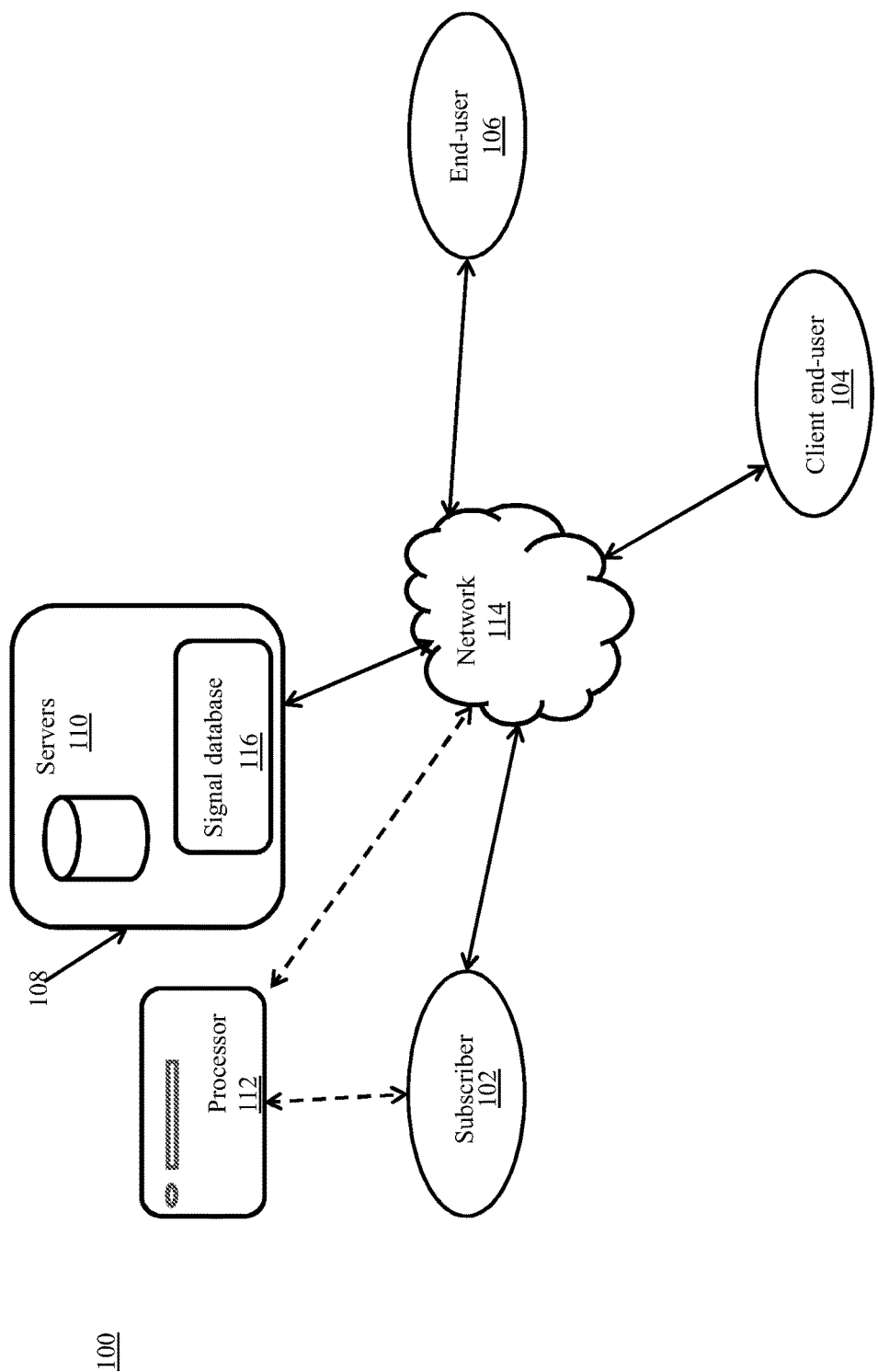
FIG. 1 depicts schematic representation of a system for providing real-time authentication of an identity of an end-user, in accordance with an aspect of the present invention.

Referring to FIG. 1, in one embodiment, is a system 100 for authenticating an identity of an end-user 106 on an electronic device (not shown) associated with a subscriber 102. As depicted in FIG. 1, system 100 may include a subscriber 102, who communicates with a plurality of users, such as, a client end-user 104, and an end-user 106, using the electronic device (not shown), such as, cellular (or other mobile) devices, or home/office telephones and other wireless services. The electronic device (not shown), in one example, may be subscribed to a service provider 108 through one or more servers 110 or other computers at a remote location. Various embodiments described herein may be practiced on any electronic device that is configured to receive audio signals and communicate via a wired or a wireless network. Such electronic devices may include, but are not limited to, telephones, smartphones, cellular phones, phablets, wearables, personal digital assistants, tablet computers, and the like.

By way of example, system 100 may further include a data processing system (not shown) that is suitable for storing and/or executing program code, such as program code for performing processes described herein, and includes a processor 112 which, in one example, may be coupled directly or indirectly to memory (not shown) through, a bus (not shown). In operation and as one skilled in the art would understand, one or more processor(s) 112 obtain from memory (not shown) one or more instructions for execution by the processors. Memory (not shown) may include local memory employed during actual execution of the program code, bulk storage, and cache memories which provide temporary storage of at least some program code in order to reduce the number of times code must be retrieved from bulk storage during program code execution. A non-limiting list of examples of memory (not shown) includes a hard disk, a random access memory (RAM), a read-only memory (EPROM or Flash memory), an optical fiber, a portable compact disc read-only memory (CD-ROM), an optical storage device, a magnetic storage device, or any suitable combination of the foregoing. In one example, memory (not shown) includes an operating system (not shown) and one or more computer programs (not shown). In a specific example, the data processing system (not shown) is the electronic device (not shown), such as, a mobile device, that includes processor 112 coupled directly or indirectly to memory (not shown). In such an example, the program is software installed in the mobile device for performing the processes described herein.

Continuing with FIG. 1, subscriber 102 may register an account with a service provider 108 (who, for instance, provides a server 110) which includes information, such as, a list of authorized entities (referred to herein as "client end-user(s)") that can communicate with the subscriber 102. Additionally, client end-user 104, such as, a legitimate bank, may also register an account, upon providing authentic identifications, such as, a business license number, a phone number and the like, with server(s) 110 which, in one example, may include registering one or more signatures, such as, a digital signature (referred to herein as a public key) and an ultrasound signature. This, for instance, facilitates communication between client end-user 104 and subscriber 102 through server 110 remotely. In such an example, a wired or a wireless communication network 114 may exist between subscriber 102, client end-user 104 and server(s) 110. In one example, the wired or wireless communication network 114 can be, but is not limited to, the Internet, a LAN, Internet, cellular network, or any of a variety of other networks. Client end-user 104 may be assigned one or more signatures, such as, ultrasound signatures and/or digital signatures. In one example, the ultrasound signatures can be created by emitting one or more ultrasound signals using a specific ultrasound beep pattern at a specific ultrasound frequency. As used herein "ultrasound beep pattern" refers to a specific ultrasound signal pattern being emitted at specific time intervals and at a specific ultrasound frequency. In one example, the ultrasound frequency range may be from about 20 kHz and beyond. For instance, a client end-user X can be assigned a specific ultrasound signature that may be generated by emitting an ultrasound beep pattern for "$X_1$" seconds at an ultrasound frequency of "$X_2$" KHz, while receiving an confidential data at "$X_3$" KHz Additionally, upon registering with server(s) 110, client end-user 104 may also be issued a public encryption key for encoding communications sent between subscriber 102 and client end-user 104. The public encryption key or digital signature may also be associated with a private key during registration so that encrypted communications may be securely transmitted to the server(s) 110. By way of example, data may also be transmitted and received between client end-user 104 and subscriber 102 via ultrasound signal, where each character of the data may be converted into a mid-point of a specific ultrasound frequency range, and the data may be transmitted at that particular ultrasound frequency for a specific duration. Processor 112 may perform a continuous Fourier transform of the ultrasound signal and may look for peaks in the specified frequency range. Upon finding a peak for a significant duration, processor 112 may convert the ultrasound frequency back to character, thereby retrieving the data emitted by client end-user 104. As understood, each of these signatures, such as, digital signature and/or ultrasound signature of the client end-user may be stored at server(s) 110 at a signal database 116 specific to client end-user 104. As used herein, the "signal database" refers to a database that includes information pertaining to multiple client end-users, with each of the multiple client end-users having respective signatures (e.g., ultrasound signatures and/or digital signatures) being stored at the signal database. Each of these signatures may be sufficiently unique that allows to be recognized without errors and false signatures, as well as being sufficiently short to be quickly recognized by processor 112. In some embodiments, the digital signature may include a binary code, while the ultrasound signature may include ultrasound signals.

By way of example, subscriber 102 may access, on the electronic device (not shown), signal database 116 at server(s) 110, for instance, by installing a software specific to the client end-user 104. As described above, the client end-user software for facilitating aspects described herein runs/executes on a computer, a server or a computing system associated with the client end-user. For instance, processor 112 may be configured with an algorithm which allows retrieval of the signature(s) of client end-user 104 from signal database 116, upon receiving a query through the client end-user software, in accordance with one or more aspects of the present application as described herein. In a specific example, the client end-user software executes as a mobile application ('app') on the electronic device (not shown), such as, a mobile device, that communicates with server(s) 110, via Web services. For convenience, some aspects of the client end-user software are described herein using a mobile application as an example, though it should be appreciated that the client end-user software could be any application executing on any type of computing system, and need not be a mobile application that executes on a mobile device.

Figure 2A:
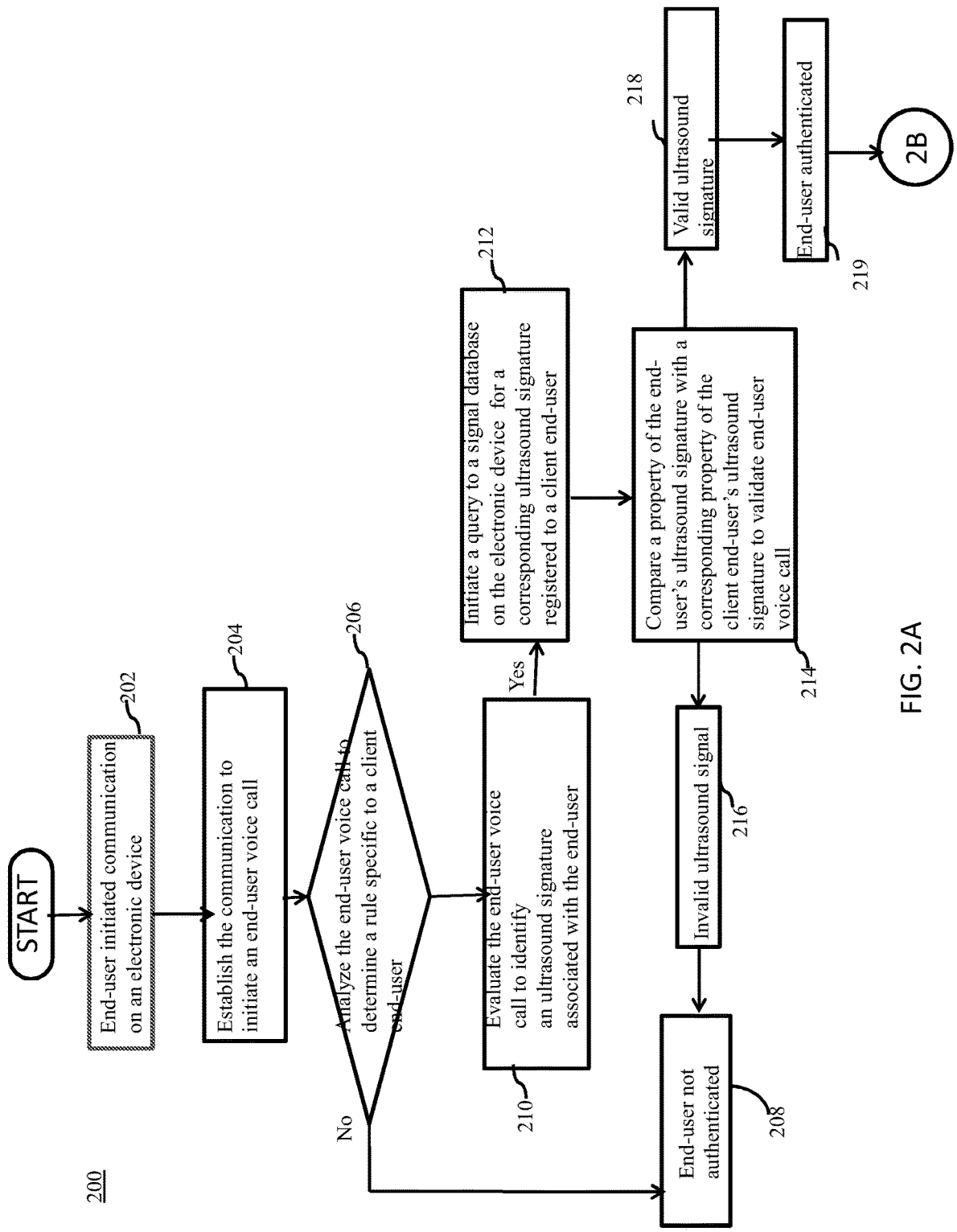
FIGS. 2A & 2B depict one embodiment of a method for providing real-time authentication of the identity of the end-user, in accordance with an aspect of the present invention.

Referring to FIG. 2A, an end-user 106 (FIG. 1) initiates (step 202) a voice call to subscriber 102 (FIG. 1) on the electronic device (not shown) and establishes (step 204) a communication with subscriber 102 (FIG. 1). By way of an example, subscriber 102 (FIG. 1) may utilize a voice recognition technique to identify an identity of end-user 106 (FIG. 1). For instance, the identity of end-user 106 (FIG. 1) may accomplished using voice recognition, in one embodiment, by identifying the end-user's speech pattern in general, or the end-user's speech pattern related to a predetermined word/phrase pronounced by end-user 106 (FIG. 1). As understood, in one embodiment, any end-user that identifies as a specific client end-user should have a corresponding signature that is specific to that particular client end-user. For instance, an end-user claiming to be a client end-user X should have a corresponding ultrasound signature that includes emitting an ultrasound beep pattern for "$X_1$" seconds at an ultrasound frequency of "$X_2$" KHz, while receiving an confidential data at "$X_3$" KHz.

In one aspect, while subscriber 102 (FIG. 1) recognizes the identity of end-user 106 (FIG. 1), the client end-user software running an application on the electronic device (not shown) may concurrently analyze (step 206) the voice call of end-user 106 (FIG. 1) to determine a rule specific to end-user 106 (FIG. 1). As used herein, the "rule" refers to the information regarding signature(s), such as, an ultrasound signature and/or a digital signature, associated with the end-user. For instance, processor 112 (FIG. 1) analyzes and/or tracks (step 206) the voice call of end-user 106 (FIG. 1) to recognize whether an identity of end-user 106 (FIG. 1) is stored on memory (not shown) of the electronic device. In such an example, processor 112 (FIG. 1) may track the voice call of end-user 106 (FIG. 1) to identify a predetermined word/phrase (such as, a password). Alternatively, processor 112 (FIG. 1) may analyze the voice call of end-user 106 (FIG. 1) to identify the end-user's speech patterns, in general, or the end-user's speech patterns related to pre-defined word/phrase which is pronounced by end-user. This, in turn, facilitates processor 112 (FIG. 1) to evaluate the voice call of end-user 106 (FIG. 1) so as to identify any possible signature (for example, ultrasound signature and/or a public key) specific to end-user 106. For instance, processor 112 (FIG. 1) has been configured to evaluate the voice call of end-user 106 (FIG. 1) to identify the ultrasound signature which, for instance, allows for identifying the ultrasound beep pattern of the ultrasound signal(s) being emitted at a specific time interval, as well as with the frequency at which each of the ultrasound signal(s) are emitted. In a specific example, if end-user 106 (FIG. 1) were to be an unscrupulous entity who fails to emit any possible ultrasound signal, processor 112 (FIG. 1), upon analyzing, fails to detect any presence of an ultrasound signature associated with the voice call. In such an example, processor 112 (FIG. 1) may display an alert (step 208) on a screen of the electronic device (not shown) for subscriber 102 (FIG. 1). For instance, the alert may include a display, such as, "CALLER NOT AUTHENTICATED". Alternatively, subscriber 102 (FIG. 1), upon recognizing the identity of end-user 106 (FIG. 1), may initiate the client end-user software by pressing a button (not shown) located on the electronic device (not shown) so as to facilitate analyzing and evaluating the voice-call of end-user 106 (FIG. 1).

Continuing with FIG. 2A, upon identifying a signature (and in particular, an ultrasound signature) associated with end-user 106 (FIG. 1), processor 112 (FIG. 1) may be configured to initiate (step 212) a query to signal database 116 (FIG. 1) so as to retrieve a signature (and in particular, a corresponding ultrasound signature) specific to client end-user 104 (FIG. 1). Further, processor 112 (FIG. 1) may be configured to compare (step 214) the ultrasound signature associated with end-user 106 (FIG. 1) with the ultrasound signature specific to client end-user 104 (FIG. 1) that has been retrieved from signal database 116 (FIG. 1). By way of example, processor 112 (FIG. 1) has been configured to compare one or more properties of the respective ultrasound signatures. As used herein, a "property" refers to an ultrasound beep pattern and/or an ultrasound frequency with which each of the ultrasound signals corresponding to end-user 106 (FIG. 1) and client end-user 104 (FIG. 1) are emitted to create their respective ultrasound signatures.

As described above, note that, processor 112 (FIG. 1) has identified the ultrasound signature (such as, for instance, the ultrasound beep pattern and the frequency) of the end-user. This, for instance, facilitates processor 112 (FIG. 1) to compare the ultrasound beep pattern of the end-user's ultrasound signature with a corresponding ultrasound beep pattern of the client end-user's ultrasound signature. Additionally, processor 112 (FIG. 1) is also configured to compare the frequencies at which each of these ultrasound signals are being emitted. In one embodiment, as one skilled in the art will understand, processor 112 (FIG. 1) may verify and/or compare the properties of the respective ultrasound signatures using conventional processes, such as, digital or analog processes. Upon comparing, processor 112 (FIG. 1) may be configured to create an alert (step 216) which, in one example, may include a display (step 208), such as, "CALLER NOT AUTHENTICATED" on the screen of the electronic device, if a property of the end-user's ultrasound signature is not consistent with a property of the client end-user's ultrasound signature. Similarly, if the property of the end-user's ultrasound signature is consistent with the property of the client end-user's ultrasound signature, the identity of the end-user is authenticated (step 218), for instance, with a display (step 219), such as, "CALLER AUTHENTICATED", on a screen of the electronic device.

Figure 2B:
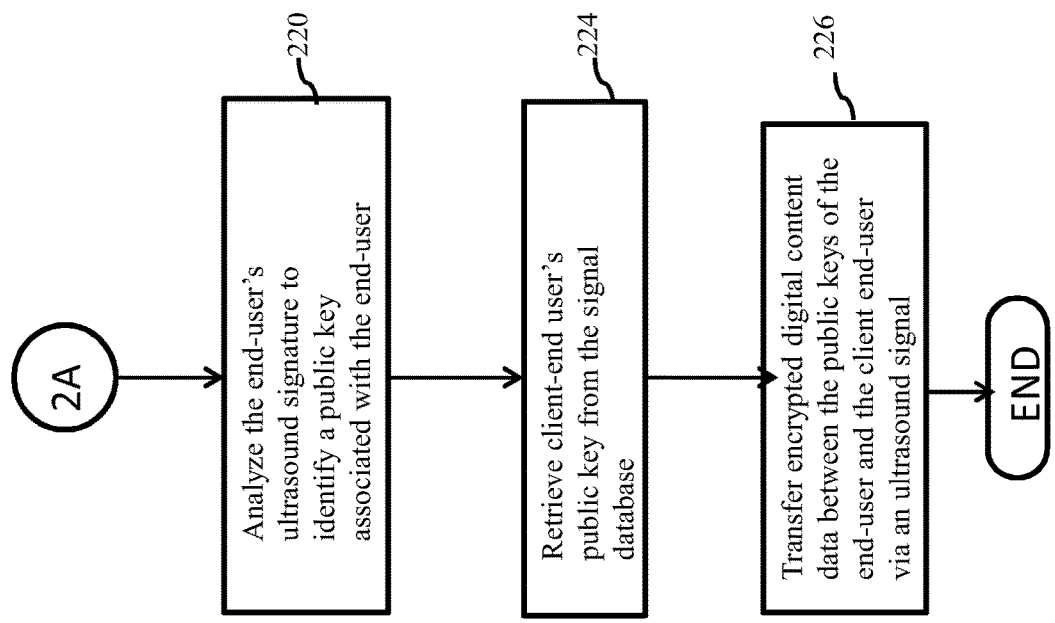

As depicted in FIG. 2B, upon authentication of the identity of end-user 106 (FIG. 1), in enhanced embodiment, processor 112 (FIG. 1) may be configured to evaluate (step 220) the ultrasound signature of end-user 106 (FIG. 1) so as to identify a public key associated with end-user 106 (FIG. 1). In a specific example, the public key associated with end-user 106 (FIG. 1) can be identified by analyzing the ultrasound beep pattern of the ultrasound signals being emitted at specific time interval; thereby validating the public key with the data inferred from the voice-call of end-user 106 (FIG. 1). Alternatively, the public key of end-user 106 (FIG. 1) can also be identified concurrently with the identification of end-user's ultrasound signature in step 210 (FIG. 2A). Processor 112 (FIG. 1) may further be configured to issue a query or a challenge to signal database 116 (FIG. 1) so as to retrieve (step 224) a public key of client end-user 104 (FIG. 1). As one skilled in the art will understand, in public key communications environments, one or more users, such as, subscriber 102 (FIG. 1), client end-user 104 (FIG. 1) and end-user 106 (FIG. 1) efficiently communicate with each other, by often encrypting the information (e.g., data, messages, etc.) that is sent from a sender to a receiver to camouflage the plain text of the information. When the receiver receives the encrypted information, the receiver decrypts the information to obtain the plan text. In one example, at least one key is used to encrypt/decrypt the information. For instance, in public key cryptography, a pair of keys is used, including a public key and a private key. As understood, while the public key is public, the private key is secure. The private key is not transmitted or shared with anyone but the user.

Continuing with FIG. 2B, in a preferred embodiment, processor 112 (FIG. 1) may be configured to transfer (step 226) encrypted digital content data, pertaining to subscriber 102 (FIG. 1), between the public keys of each of end-user 106 (FIG. 1) and client end-user 104 (FIG. 1) via an ultrasound signal. By way of an example, as described above, the data may be transmitted and received between two users, (for instance, end-user 106 (FIG. 1) and client end-user 104 (FIG. 1)) via an ultrasound signal, where each character of the data may be converted into a mid-point of a specific ultrasound frequency range, and the data may be transmitted between the two users at that particular ultrasound frequency for a specific duration. Processor 112 (FIG. 1) may perform a continuous Fourier transform of the ultrasound signal and may look for peaks in the specified frequency range. Upon finding a peak for a significant duration, processor 112 (FIG. 1) may convert the ultrasound frequency back to character, thereby retrieving the data emitted by client end-user 104 (FIG. 1). Note that, in another embodiment, the data may also be transferred using other conventional techniques, such as, infrared communication and radio communication, for example, "Bluetooth" technology. Further, as understood, since the data has been encrypted using a public key, only the user (for example, an authentic end-user 106 (FIG. 1)) having a corresponding private key can access the confidential data. Advantageously, such a real-time on-the fly transfer of the secure encrypted digital content data between the end-user and client end-user and/or subscriber can be achieved with no additional cost to an IP or other network channels.

Figure 3:
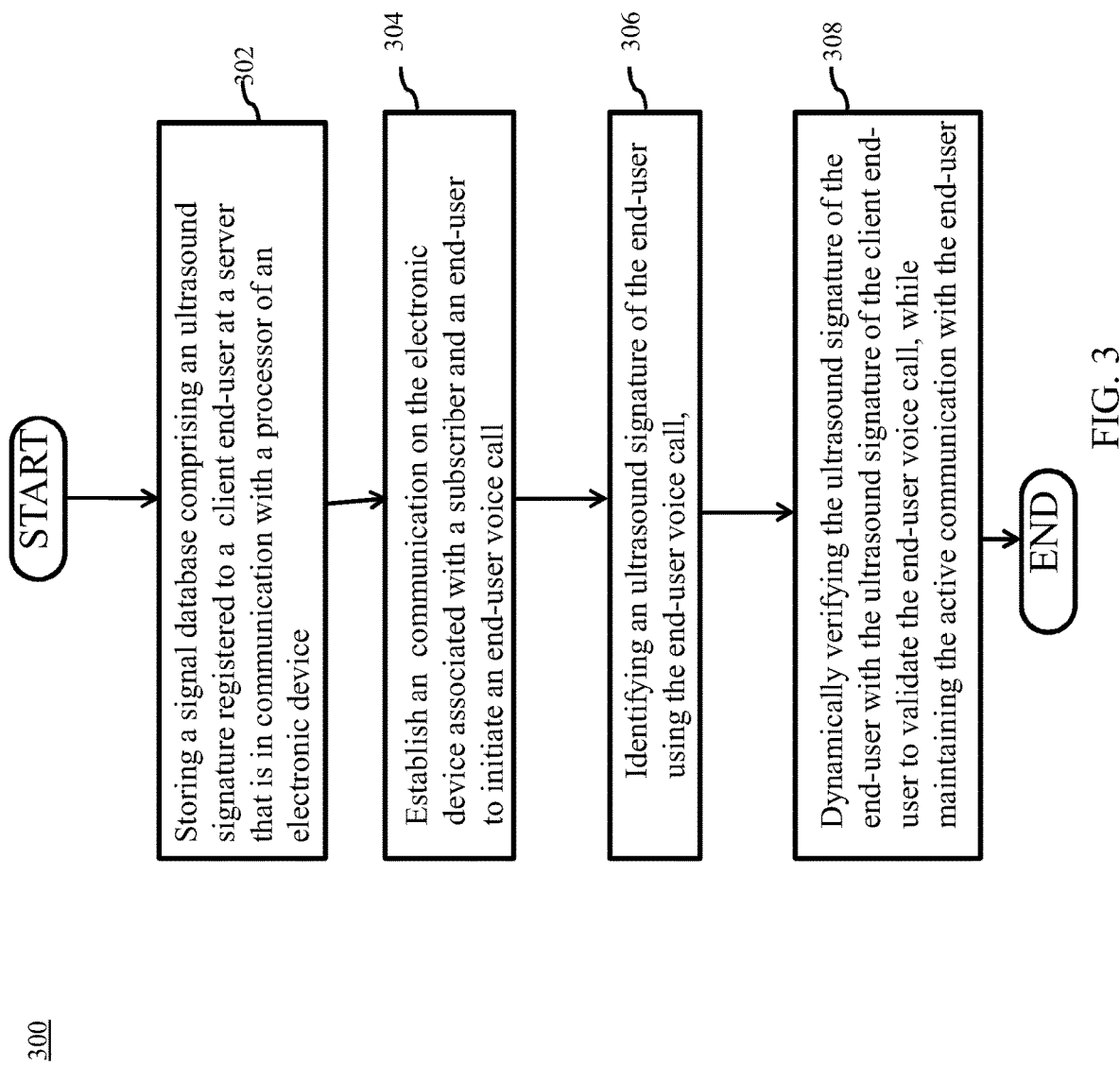
FIG. 3 depicts one embodiment of a process for providing real-time authentication of the identity of the end-user, in accordance with an aspect of the present invention.

FIG. 3 is an overview of process 300 for providing real-time authentication of the identity of end-user on an electronic device, in accordance with an aspect of the present invention. The process 300 begins with storing 302, at a server that is in communication with a processor, a signal database registered to a client end-user, in which the processor is configured to retrieve an ultrasound signature associated with the client end-user from the signal database. An active communication may be established 304 on the electronic device associated with a subscriber and the end-user to initiate a voice-call of the end-user. An ultrasound signature of the end-user may be identified 306, for instance, using the voice-call of the end-user. Process 300 proceeds to dynamically verify 308 the ultrasound signature of the end-user with the ultrasound signature of the client end-user to validate the voice-call of the end-user, while maintaining the active communication with the end-user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for authenticating an identity of an end-user on an electronic device associated with a subscriber, the system comprising:
    a processor in communication with a server, the processor being hardware configured to perform a method comprising:
    storing, at the server, a signal database registered to a client end-user, the processor being configured to retrieve, from the signal database, an ultrasound signature associated with the client end-user;
    establishing an active communication with the end-user on the electronic device to initiate an end-user voice call;
    identifying, using the end-user voice call, an ultrasound signature associated with the end-user; and
    dynamically verifying the ultrasound signature associated with the end-user with the ultrasound signature of the client-end user to validate the end-user voice call, while maintaining the continuous active communication with the end-user;
    wherein a property of the ultrasound signature of the client end-user is compared with a corresponding property of the ultrasound signature associated with the end-user, wherein the property comprises an ultrasound beep pattern.

2. The system of claim 1, wherein the processor, via voice recognition of the end-user, is configured to analyze the end-user voice call to determine a rule specific to the end-user, the rule comprising information regarding at least one of the ultrasound signature and a public key associated with the end-user.

3. The system of claim 2, wherein the processor is further configured to evaluate the end-user voice call to identify the ultrasound signature associated with the end-user.

4. The system of claim 2, wherein the processor is configured to initiate a query to the signal database of the client end-user to retrieve the ultrasound signature associated with the client end-user, subsequent to the identification of the ultrasound signature associated with the end-user.

5. The system of claim 1, wherein the property of the ultrasound signature associated with the end-user further comprises an ultrasound frequency.

6. The system of claim 2, wherein the processor is configured to analyze the ultrasound signature to retrieve the public key associated with the end-user, subsequent to the validation of the end-user voice call.

7. The system of claim 6, wherein the processor is configured to retrieve a public key associated with the client end-user.

8. The system of claim 1, wherein the processor is further configured to create an alert, if the ultrasound signature associated with the client end-user and the ultrasound signature associated with the end-user are inconsistent with the audio signal of the end-user.

9. A computer program product for authenticating an identity of an end-user on an electronic device associated with a subscriber, the computer program product comprising:
   a computer readable storage device storing program instructions readable by a processor in communication with a server for execution to perform a method comprising:
   storing, at the server, a signal database registered to a client end-user, the processor being configured to retrieve from the signal database an ultrasound signature associated with the client end-user;
   establishing an active communication with the end-user on the electronic device to initiate an end-user voice call;
   identifying, using the end-user voice call, an ultrasound signature associated with the end-user; and
   dynamically verifying the ultrasound signature associated with the end-user with the ultrasound signature of the client-end user to validate the end-user voice call, while maintaining the active communication with the end-user;
   wherein a property of the ultrasound signature of the client end-user is compared with a corresponding property of the ultrasound signature associated with the end-user, wherein the property comprises an ultrasound beep pattern.

10. The computer readable storage device of claim 9, wherein the processor is configured to create an alert, if the ultrasound signature associated with the client end-user and the ultrasound signature associated with the end-user are inconsistent with the audio signal of the end-user.

11. A method for authenticating an identity of an end-user on an electronic device associated with a subscriber, the method comprising:
   storing, at a server that is in communication with a processor, a signal database registered to a client end-user, the processor being configured to retrieve from the signal database an ultrasound signature associated with the client end-user;
   establishing an active communication with the end-user on the electronic device to initiate an end-user voice call;
   identifying, using the end-user voice call, an ultrasound signature associated with the end-user; and
   dynamically verifying the ultrasound signature associated with the end-user with the ultrasound signature of the client-end user to validate the end-user voice call, while maintaining the active communication with the end-user;
   wherein a property of the ultrasound signature of the client end-user is compared with a corresponding property of the ultrasound signature associated with the end-user, wherein the property comprises an ultrasound beep pattern.

12. The method of claim 11, wherein the identifying comprises analyzing the end-user voice call, via voice recognition of the end-user, to determine a rule specific to the end-user, the rule comprising information regarding at least one of the ultrasound signature and a public key associated with the end-user.

13. The method of claim 12, wherein the identifying further comprises evaluating the end-user voice call to identify the ultrasound signature associated with the end-user.

14. The method of claim 12, further comprising initiating a query to the signal database of the client end-user to retrieve the ultrasound signature thereof, subsequent to the identification of the ultrasound signature associated with the end-user.

15. The method of claim 12, wherein the property of the ultrasound signature associated with the end-user further comprises an ultrasound frequency.

16. The method of claim 12, further comprising analyzing the ultrasound signature to retrieve a public key associated with the end-user, subsequent to the validation of the end-user voice call.

17. The method of claim 16, further comprising initiating a query to the signal database of the client end-user to retrieve a public key thereof.

18. The method of claim 11, further comprising creating an alert, if the ultrasound signature associated with the client end-user and the ultrasound signature associated with the end-user are inconsistent with the audio signal of the end-user.

* * * * *